United States Patent
Pyper

[11] 3,819,096
[45] June 25, 1974

[54] GLASS BREAKING

[76] Inventor: Alan Smith Pyper, 6 Warkton Close, Chilwell, Nottinghamshire, England

[22] Filed: Nov. 30, 1972

[21] Appl. No.: 310,713

[30] Foreign Application Priority Data
Nov. 30, 1971  Great Britain.................... 55620/71

[52] U.S. Cl............................... 225/96.5, 225/104
[51] Int. Cl............................................. C03b 33/02
[58] Field of Search................... 225/104, 103, 96.5

[56] References Cited
UNITED STATES PATENTS

| | | | |
|---|---|---|---|
| 954,773 | 4/1910 | Armstrong.......................... | 225/104 |
| 2,212,599 | 8/1940 | Hall ..................................... | 225/104 |
| 3,494,521 | 2/1970 | Hellstrom ....................... | 225/104 X |
| 3,562,803 | 2/1971 | Townsend........................... | 225/104 |

*Primary Examiner*—Frank T. Yost
*Attorney, Agent, or Firm*—Wenderoth, Lind & Ponack

[57] ABSTRACT

Apparatus for producing clean breaks in glass for the manufacture of knives comprises a vice and a scoring device mounted on a common base board. The vice includes two protrusions on one jaw and a third protrusion on the other jaw formed by the tip of a screw which can be advanced and retracted at right angles to the jaws. Guide blocks on one of the jaw faces are provided to ensure that a score line on a square of glass to be broken coincides with the third protrusion. The scoring device includes guide faces to align glass to be scored for breakage so that the intended score line underlies a cutter mounted for linear movement on a flap which is pivotally attached to base board so that it may be swung clear to locate the glass on the base board in abutment with the guide faces.

6 Claims, 7 Drawing Figures

PATENTED JUN 25 1974 3,819,096

GLASS BREAKING

This invention relates to glass breaking and in particular to apparatus for breaking sheet glass cleanly along predetermined lines to produce accurately shaped pieces.

Ultramicrotomes, which are used for cutting extremely thin sections from a specimen for the purpose of microscopic examination, commonly employ glass knives as the cutting elements. The general current procedure for producing such knives includes the steps of breaking a piece of glass of about 6 mm to 8 mm thickness into rectangular strips of about 30 mm wide, breaking the strips into smaller pieces 30 mm square, and then obtaining triangular pieces from the squares by scoring them diagonally and breaking them in two along the score line. Each triangular piece forms a microtome knife having a cutting edge at one of the acute angles.

Unfortunately when glass is broken by bending it about a score line the surface at the break is distorted and thus a knife edge formed by the intersection of two such break surfaces is also distorted, with the result that the cuts produced by such a knife are inaccurate.

It is well known that if glass is broken by scoring only partially along the line of the required break before the fracture is made, the broken surfaces along the score are still distorted but beyond the end of the scored part of the line in the part known as the 'free break,' the fracture is substantially free of distortion. However, in the past fractures employing a free break part have not been generally used in glass knife production as skilled manual labour is required and it has been difficult to produce a number of successive knives accurately and consistently.

The object of the present invention is to provide apparatus which is capable of breaking sheet glass without distortion by employing the free break principle, both accurately and consistently, even in the hands of an unskilled operator.

Apparatus in accordance with the invention for producing linear breaks in glass sheet comprises a vice having a pair of relatively movable parallel jaws, one of which is provided with two spaced apart protrusions to engage one surface of a glass sheet to be broken between the jaws, the other jaw having a further protrusion mounted thereon to project towards the first-mentioned jaw and independently movable towards and away from it in a line at right angles to the jaw faces and in a plane equidistant from the said two protrusions, one of the jaws further having adjustable guide means on its face so arranged that when a square plate of glass is placed between the jaws with two adjacent edges thereof abutting the guide means a predetermined diagonal line across the square plate intersecting adjacent edges near opposite corners thereof lies in the said plane containing the movable protrusion.

The apparatus in accordance with the invention preferably further includes a scoring device for making a scratch on the glass plate to initiate the break therein, the device comprising a supporting structure having guide members arranged to locate a sheet glass square abutting them in such a position that the predetermined position of the above-mentioned diagonal line is located directly beneath a linearly movable glass cutter also mounted on the supporting structure.

In one preferred form of the invention the supporting structure forms a mounting for the vice and the scoring device includes further guides for enabling a sheet of glass to be scored correctly for breaking into pieces so as to form the squares to be broken.

A preferred embodiment of the invention will now be described in detail by way of example with references to the accompanying drawings wherein.

Figure 6:
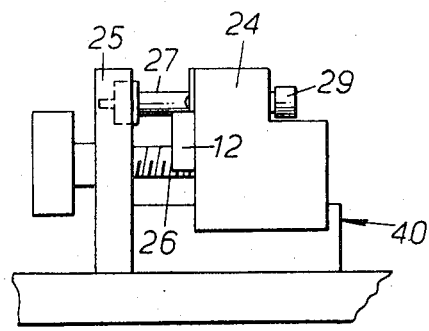
FIG. 6 shows a side elevation of the vice.
Figure 7:
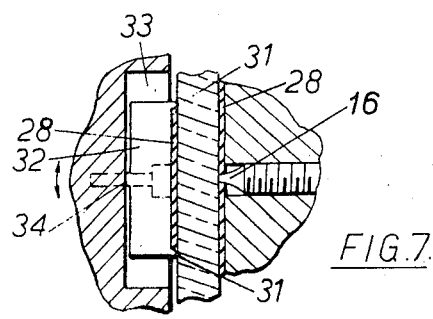
FIG. 7 shows on an enlarged scale, a sectional plan of a detail of the vice.

Apparatus for producing glass knives in accordance with the invention comprises a rectangular base board 20 for supporting in spaced-apart relation a device 30 (FIGS. 1–3) for making linear scores or scratches on sheet glass and a vice 40 (FIGS. 6 and 7) to exert pressure on the sheet glass thus scored to fracture it along lines determined by the scores or scratches.

Figure 1:
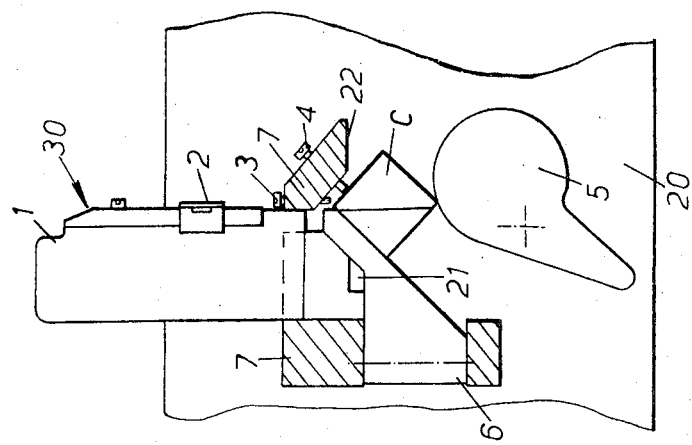
FIG. 1 shows a plan view of a part of the apparatus for scoring glass.

As shown diagrammatically in FIG. 1, the scoring device comprises two spaced-apart abutment blocks 7 mounted on the base board forming guides for a piece of sheet glass A to be scored, and a rotatable cam-shaped presser member 5. One of the blocks is, as shown, provided with a right-angled recess 21 forming an abutment for a corner of the glass sheet; the other block has an abutment edge 22 in line with one side of the recess to form an edge abutment for the sheet which is firmly held against the blocks by finger pressure on the support 5. A scoring cutter 2 is mounted for free linear movement on a guide flap 1 which is pivotally attached to the base board 20 so that it can be swung over to bring the cutter into and out of contact with the glass sheet.

A further guide 6, which is also pivotally mounted on the base board for movement about an axis at right angles to that of the flap 1, is provided with an abutment edge 23 angularly disposed to its pivot axis to engage one of the sides of a glass square to be scored diagonally by the cutter, an adjacent edge of the square being located by an abutment screw 4 in one of the blocks, as will shortly be described. The device further includes an adjustable stop screw 3 to limit the travel of the cutter 2 as will also be described in more detail hereinafter.

Figure 4:
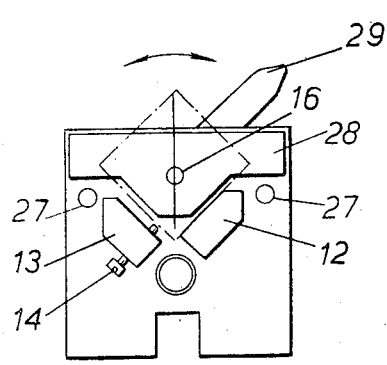
FIG. 4 shows an elevation of a jaw of a vice forming a further part of the apparatus.
Figure 5:
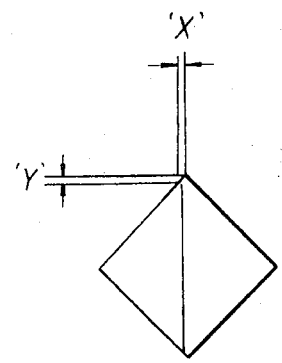
FIG. 5 shows a glass square scored for breaking.

Also mounted on the base plate and spaced apart from the scoring device is a breaking vice 40 (FIGS. 4–7) having a pair of upstanding relatively movable parallel jaws 24,25. The face of the rear jaw 24 is shown in FIG. 4 and is movable towards and away from the front fixed jaw by a lead screw 26 in conventional manner. The rear jaw has two locating dowels 27 lying parallel with the direction of movement of the jaw and which pass through holes in the front jaw to provide rigidity, to maintain accurate movement between the jaws, and also to act as supports for squares and rectangles of glass to be placed in the vice for breaking, as will be hereinafter described.

The rear jaw carries on its clamping face two fixed guide blocks 12, 13 to accurately locate a glass square to be broken diagonally, the precise location of such a square relative to the jaws being determined by the position of an adjustable abutment screw 14 mounted on the block 13 as shown in FIG. 4.

Each of the jaws is faced with a layer 28 of resilient material, such as rubber, to damp out vibrations arising in the glass during breakage. The rear jaw carries a screw 16 having a rounded point to engage glass held between the jaws and forming a protrusion which is advanced and retracted by rotation of the screw produced by the movement of a lever 29.

The front jaw has a pair of spaced-apart adjustable pressure points or protrusions 31 which are located an equal distance on either side and in the same horizontal plane as that containing the screw point 16. The protrusions are formed on the surface of a block 32 which carries the rubber layer 28 and is located within a recess 33 in the jaw. The block can rock about a pivot point 34 and so equalize pressure on the points 31 when the glass is fractured. A pin 35 prevents sideways movement of the block.

The top surfaces of both jaws have guide lines at right angles to their clamping faces in a vertical plane containing the point of the screw 16.

In the operation of the device to produce a triangular glass knife for a microtome a glass square of approximately 60 mm by 60 mm is placed on the scoring device in abutment with the blocks 7 and held firmly in contact therewith by pressure on the rotatable support 5 as shown in FIG. 1. At this stage both the flap 1 and the abutment plate 6 are swung on their pivots clear of the plate as shown in the Figure. The flap 1 is then swung about its pivot in the direction shown by the bent arrow 36 to bring the cutter 2 into contact with the uppermost surface of the square A and the cutter moved along its slide to produce a score 8 extending across the surface for a distance of approximately 40 mm from the edge of the glass which is in abutment with both blocks 7.

The flap is then swung back clear of the plate and the glass plate is transferred to the vice and placed between the jaws to rest edgewise on the supporting dowels 27 with the score line vertical and in register with the centre lines marked on the tops of the vice jaws. The edge which is free of the score line, i.e. the edge shown lowermost in FIG. 1, is uppermost when the square is in the vice. After the vice jaws have been closed to hold the square, the lever 29 is then rotated to advance the protruding screw point 16 whereupon the glass is broken into two equal rectangles along a line coincident with and extending beyond the score line 8. Each rectangle so produced will thus have one edge having an undistorted length as a result of the free break beyond the end of the score line 8.

Figure 2:
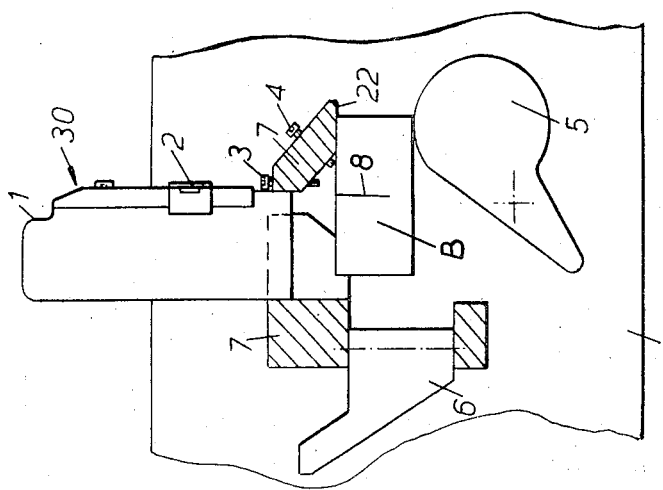
FIGS. 2 and 3 show the same view as FIG. 1 with parts of the apparatus positioned for successive operations.

One of the rectangles is then placed in the scoring device in the manner shown in FIG. 2 at B, the flap 1 pivoted to bring the cutter into engagement with the uppermost surface of the rectangle and the glass is then scored in the manner previously described for about 20 mm away from the edge which contains the free break.

The scored rectangle is then transferred to the vice and broken by operation thereof as previously described to form two squares, each of 30 mm length of side, and having a corner formed by the intersection of two free break side portions.

Figure 3:
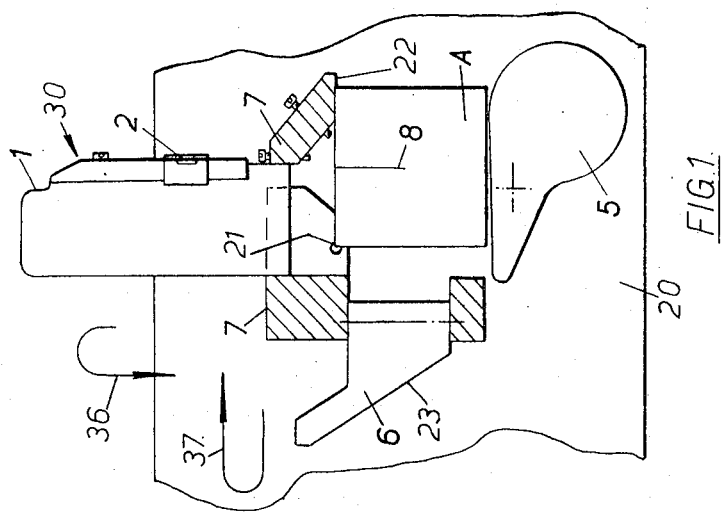

One of the squares is then returned to the scoring device in the position shown in FIG. 3 at C and is held by pressure on the support 5 in abutment with the end of the screw 4 and the sloping edge of the abutment flap 6 which is rotated about its pivot axis as indicated by the arrow 37 (FIG. 1) into the position shown in FIG. 3. The screw 4 is adjusted so that a score line 8 produced by movement of the cutter 2 after flap 1 has been pivoted into its operating position lies to one side of the true diagonal through opposed corners of the square and the stop screw 3 is adjusted so that when scoring takes place the cutter is stopped short of the side of the square abutting the abutment flap. The score line produced has the characteristic shown in FIG. 5 of the drawings with the end of the line clearly spaced from the corner of the square defined by the free break portions of two of its sides by the distances X and Y.

The scored square is then placed between the vice jaws with the aforementioned free break corner downmost. The scored line is located exactly in register with the protruding screw end 16 by appropriate movement of the abutment screw 14, the vice jaws closed, and the square then broken diagonally by movement of the lever 29 as before. The location of the square is shown in FIG. 4 from which it will be clear that the right hand triangular piece produced by the break and which forms the glass knife contains an edge at one of its acute angled corners formed by two intersecting free break surfaces which thus forms a distortion-free accurate cutting edge.

It will be clear that the remaining rectangles and squares derived from the original large square A can be similarly scored and broken to produce further knives and once the screws 3, 4 and 14 are correctly adjusted consistent high quality and accuracy is assured.

No great skill is required on the part of the operator, the only necessity being to ensure that during scoring and breaking the glass pieces are maintained snugly in contact with the appropriate guides or abutments.

For optimum results the diagonal break should be made as close as possible to a corner of the glass square without intersecting that corner. A suitable value for the distance X, for example, is 0.5 mm, and the distance Y, i.e., the distance between the end of the diagonal score and the edge of the square nearest thereto should be as small as is consistent with the production of a free break condition where the fracture meets the square X. These distances are best found by experience.

At present knives for ultramicrotomes are commonly made of plate glass sheet of a thickness between 6 mm and 8 mm. There is, however, an increasing demand for knives made from sheets of between 10 mm and 12 mm thick. Heretofore such knives have had to be made by hand using pliers to grip the sheets and distort them to produce the requisite break and, as a result, even with skilled operators, the amount of wastage has been high. By the use of the present invention the production of knives from such thicker glass plate is no more difficult than the production of knives from 6 mm to 8 mm glass and the quality is just as high.

I claim:

1. Apparatus for producing linear breaks in glass sheet comprising a vice having a pair of relatively movable parallel jaws, one of which is provided with two spaced-apart protrusions to engage one surface of a glass sheet to be broken between the jaws, the other jaw having a further protrusion mounted therein to project towards the first-mentioned jaw and independently movable towards and away from it in a line at right angles to the two jaw faces and in a plane equidistant from the said two protrusions, one of the jaws further having adjustable guide means on its face and adjustable so that when a square plate of glass is placed between the jaws with two adjacent edges thereof abutting the guide means, a predetermined diagonal line across the square plate intersecting adjacent edges near opposite corners thereof lies in the said plane containing the movable protrusion.

2. Apparatus according to claim 1 wherein the guide means is mounted on the jaw provided with the said movable protrusion.

3. Apparatus according to claim 1 wherein the guide means comprises two blocks having straight guide edges, one of the blocks having an adjustable abutment screw projecting from its guide edge to form with the guide edge of the other block abutment means to receive the adjacent edges of a glass sheet to be broken.

4. Apparatus according to claim 1 wherein each jaw is faced with a resilient layer.

5. Apparatus according to claim 1 wherein the movable protrusion comprises a screw having a rounded point to engage the glass sheet and which is advancable and retractable by rotation produced by the movement of a lever attached to the screw.

6. Apparatus according to claim 1 wherein the two spaced-apart protrusions are formed on the surface of a block rockably mounted on the said jaw.

* * * * *